US011477127B2

(12) United States Patent
Ramaswamy et al.

(10) Patent No.: US 11,477,127 B2
(45) Date of Patent: Oct. 18, 2022

(54) METHODS AND APPARATUS FOR APPLICATION AWARE HUB CLUSTERING TECHNIQUES FOR A HYPER SCALE SD-WAN

(71) Applicant: VMware, Inc., Palo Alto, CA (US)

(72) Inventors: Navaneeth Krishnan Ramaswamy, Chennai (IN); Gopa Kumar, Milpitas, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/072,764

(22) Filed: Oct. 16, 2020

(65) Prior Publication Data

US 2022/0006751 A1 Jan. 6, 2022

(30) Foreign Application Priority Data

Jul. 2, 2020 (IN) .............................. 202041028276

(51) Int. Cl.
*H04L 47/2483* (2022.01)
*H04L 45/74* (2022.01)
(Continued)

(52) U.S. Cl.
CPC .......... *H04L 47/2483* (2013.01); *H04L 12/44* (2013.01); *H04L 12/4633* (2013.01);
(Continued)

(58) Field of Classification Search
None
See application file for complete search history.

(56) References Cited

U.S. PATENT DOCUMENTS

| 5,652,751 A | 7/1997 | Sharony |
| 5,909,553 A | 6/1999 | Campbell et al. |

(Continued)

FOREIGN PATENT DOCUMENTS

| CN | 1926809 A | 3/2007 |
| CN | 102577270 A | 7/2012 |

(Continued)

OTHER PUBLICATIONS

Non-Published Commonly Owned Related International Patent Application PCT/US2021/031454 with similar specification, filed May 8, 2021, 35 pages, VMware, Inc.

(Continued)

*Primary Examiner* — Christine T Duong
(74) *Attorney, Agent, or Firm* — Adeli LLP

(57) ABSTRACT

Some embodiments provide a method for a software-defined wide area network (SD-WAN) connecting first and second sites, with the first site including an edge node and the second site including multiple forwarding hub nodes. At the edge node of the first site, the method receives a packet of a particular flow including a flow attribute. The method uses the flow attribute to identify a hub-selection rule from multiple hub-selection rules, each hub-selection rule identifying at least one forwarding hub node at the second site for receiving one or more flows from the first site, and at least one hub-selection rule identifying at least one forwarding hub node that is not identified by another hub-selection rule. The method uses the identified hub-selection rule to identify a forwarding hub node for the particular flow. The method then sends the packet from the edge node at the first site to the identified forwarding hub node at the second site.

21 Claims, 6 Drawing Sheets

(51) Int. Cl.
*H04L 12/46* (2006.01)
*H04L 12/44* (2006.01)
*H04L 12/66* (2006.01)
*H04L 45/00* (2022.01)
*H04L 45/64* (2022.01)
*H04L 47/2441* (2022.01)
*H04L 47/80* (2022.01)
*H04L 67/1031* (2022.01)

(52) U.S. Cl.
CPC .......... *H04L 12/4641* (2013.01); *H04L 12/66* (2013.01); *H04L 45/38* (2013.01); *H04L 45/64* (2013.01); *H04L 45/74* (2013.01); *H04L 47/2441* (2013.01); *H04L 47/803* (2013.01); *H04L 67/1031* (2013.01)

(56) References Cited

U.S. PATENT DOCUMENTS

| | | |
|---|---|---|
| 6,154,465 A | 11/2000 | Pickett |
| 6,157,648 A | 12/2000 | Voit et al. |
| 6,201,810 B1 | 3/2001 | Masuda et al. |
| 6,363,378 B1 | 3/2002 | Conklin et al. |
| 6,445,682 B1 | 9/2002 | Weitz |
| 6,744,775 B1 | 6/2004 | Beshai et al. |
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,855,071 B1 | 10/2014 | Sankaran et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Ku |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,648,547 B1 | 5/2017 | Hart et al. |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,200,264 B2 | 2/2019 | Menon et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,693,739 B1 | 6/2020 | Naseri et al. |
| 10,749,711 B2 | 8/2020 | Mukundan et al. |
| 10,778,466 B2 | 9/2020 | Cidon et al. |
| 10,778,528 B2 | 9/2020 | Mayya et al. |

(56) References Cited

U.S. PATENT DOCUMENTS

| | | |
|---|---|---|
| 10,778,557 B2 | 9/2020 | Ganichev et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 10,999,197 B2 | 5/2021 | Hooda et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,310,170 B2 | 4/2022 | Cidon et al. |
| 11,323,307 B2 | 5/2022 | Mayya et al. |
| 11,381,474 B1 | 7/2022 | Kumar et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0149604 A1 | 7/2005 | Navada |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |

(56) References Cited

U.S. PATENT DOCUMENTS

| | | |
|---|---|---|
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0255169 A1 | 9/2016 | Kovvuri et al. |

(56) References Cited

U.S. PATENT DOCUMENTS

| | | |
|---|---|---|
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |

(56) References Cited

U.S. PATENT DOCUMENTS

| | | |
|---|---|---|
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0140889 A1 | 5/2019 | Mayya et al. |
| 2019/0140890 A1* | 5/2019 | Mayya ............... H04L 41/0654 |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1* | 8/2019 | Markuze ............... H04L 67/10 |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Vallur et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0105199 A1 | 4/2021 | H et al. |
| 2021/0112034 A1* | 4/2021 | Sundararajan ......... H04L 49/25 |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160169 A1 | 5/2021 | Shen et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |

(56) References Cited

U.S. PATENT DOCUMENTS

| | | | |
|---|---|---|---|
| 2021/0377156 A1 | 12/2021 | Michael et al. | |
| 2021/0392060 A1 | 12/2021 | Silva et al. | |
| 2021/0392070 A1 | 12/2021 | Tootaghaj et al. | |
| 2021/0399920 A1 | 12/2021 | Sundararajan et al. | |
| 2021/0399978 A9 | 12/2021 | Michael et al. | |
| 2021/0400113 A1 | 12/2021 | Markuze et al. | |
| 2022/0006726 A1 | 1/2022 | Michael et al. | |
| 2022/0006756 A1 | 1/2022 | Ramaswamy et al. | |
| 2022/0035673 A1 | 2/2022 | Markuze et al. | |
| 2022/0038370 A1 | 2/2022 | Vasseur et al. | |
| 2022/0038557 A1 | 2/2022 | Markuze et al. | |
| 2022/0094644 A1 | 3/2022 | Cidon et al. | |
| 2022/0123961 A1 | 4/2022 | Mukundan et al. | |
| 2022/0131740 A1 | 4/2022 | Mayya et al. | |
| 2022/0131807 A1 | 4/2022 | Srinivas et al. | |

FOREIGN PATENT DOCUMENTS

| | | | |
|---|---|---|---|
| CN | 102811165 A | 12/2012 | |
| CN | 104956329 A | 9/2015 | |
| CN | 106656847 A | 5/2017 | |
| CN | 110447209 A | 11/2019 | |
| CN | 111198764 A | 5/2020 | |
| EP | 1912381 A1 | 4/2008 | |
| EP | 3041178 A1 | 7/2016 | |
| EP | 3509256 A1 | 7/2019 | |
| JP | 2010233126 A | 10/2010 | |
| JP | 2017059991 A | 3/2017 | |
| RU | 2574350 C2 | 2/2016 | |
| WO | 03073701 | 9/2003 | |
| WO | 2007016834 A1 | 2/2007 | |
| WO | 2012167184 A2 | 12/2012 | |
| WO | 2016061546 A1 | 4/2016 | |
| WO | 2017083975 A1 | 5/2017 | |
| WO | 2019070611 A1 | 4/2019 | |
| WO | 2019094522 A1 | 5/2019 | |
| WO | 2020012491 A1 | 1/2020 | |
| WO | 2020018704 A1 | 1/2020 | |
| WO | 2020091777 A1 | 5/2020 | |
| WO | 2020101922 A1 | 5/2020 | |
| WO | 2020112345 A1 | 6/2020 | |
| WO | 2021040934 A1 | 3/2021 | |
| WO | 2021118717 A1 | 6/2021 | |
| WO | 2021150465 A1 | 7/2021 | |
| WO | 2021211906 A1 | 10/2021 | |
| WO | 2022005607 A1 | 1/2022 | |

OTHER PUBLICATIONS

Non-Published Commonly Owned U.S. Appl. No. 17/233,427, filed Apr. 16, 2021, 124 pages, VMware, Inc.

Non-Published Commonly Owned U.S. Appl. No. 17/361,292, filed Jun. 28, 2021, 35 pages, Nicira, Inc.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Xie, Junfeng, et al., A Survey of Machine Learning Techniques Applied to Software Defined Networking (SDN) Research Issues and Challenges, IEEE Communications Surveys & Tutorials, Aug. 23, 2018, 38 pages, vol. 21, Issue 1, IEEE.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 16/662,363, filed Oct. 24, 2019, 129 pages, VMware, Inc.

Non-Published Commonly Owned U.S. Appl. No. 16/662,379, filed Oct. 24, 2019, 123 pages, VMware, Inc.

Non-Published Commonly Owned U.S. Appl. No. 16/662,402, filed Oct. 24, 2019, 128 pages, VMware, Inc.

Non-Published Commonly Owned U.S. Appl. No. 16/662,427, filed Oct. 24, 2019, 165 pages, VMware, Inc.

Non-Published Commonly Owned U.S. Appl. No. 16/662,489, filed Oct. 24, 2019, 165 pages, VMware, Inc.

Non-Published Commonly Owned U.S. Appl. No. 16/662,510, filed Oct. 24, 2019, 165 pages, VMware, Inc.

Non-Published Commonly Owned U.S. Appl. No. 16/662,531, filed Oct. 24, 2019, 135 pages, VMware, Inc.

Non-Published Commonly Owned U.S. Appl. No. 16/662,570, filed Oct. 24, 2019, 141 pages, VMware, Inc.

Non-Published Commonly Owned U.S. Appl. No. 16/662,587, filed Oct. 24, 2019, 145 pages, VMware, Inc.

Non-Published Commonly Owned U.S. Appl. No. 16/662,591, filed Oct. 24, 2019, 130 pages, VMware, Inc.

Non-Published Commonly Owned U.S. Appl. No. 16/721,964, filed Dec. 20, 2019, 39 pages, VMware, Inc.

Non-Published Commonly Owned U.S. Appl. No. 16/721,965, filed Dec. 20, 2019, 39 pages, VMware, Inc.

Non-Published Commonly Owned U.S. Appl. No. 16/792,908, filed Feb. 18, 2020, 48 pages, VMware, Inc.

Non-Published Commonly Owned U.S. Appl. No. 16/792,909, filed Feb. 18, 2020, 49 pages, VMware, Inc.

Non-Published Commonly Owned U.S. Appl. No. 16/851,294, filed Apr. 17, 2020, 59 pages, VMware, Inc.

Non-Published Commonly Owned U.S. Appl. No. 16/851,301, filed Apr. 17, 2020, 59 pages, VMware, Inc.

Non-Published Commonly Owned U.S. Appl. No. 16/851,308, filed Apr. 17, 2020, 59 pages, VMware, Inc.

Non-Published Commonly Owned U.S. Appl. No. 16/851,314, filed Apr. 17, 2020, 59 pages, VMware, Inc.

Non-Published Commonly Owned U.S. Appl. No. 16/851,323, filed Apr. 17, 2020, 59 pages, VMware, Inc.

Non-Published Commonly Owned U.S. Appl. No. 16/851,397, filed Apr. 17, 2020, 59 pages, VMware, Inc.

Non-Published Commonly Owned U.S. Appl. No. 17/068,603, filed Oct. 12, 2020, 37 pages, Nicira, Inc.

Non-Published Commonly Owned Related U.S. Appl. No. 17/072,774 with similar specification, filed Oct. 16, 2020, 34 pages, VMware, Inc.

Non-Published Commonly Owned U.S. Appl. No. 15/803,964, filed Nov. 6, 2017, 15 pages, The Mode Group.

Non-Published Commonly Owned U.S. Appl. No. 16/216,235, filed Dec. 11, 2018, 19 pages, The Mode Group.

Non-Published Commonly Owned U.S. Appl. No. 16/818,862, filed Mar. 13, 2020, 198 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium an Architectures for Networking and Communications Systems (ANCS), Oct. 20-21, 2014, 11 pages, IEEE, Marina del Rey, CA, USA.

(56) References Cited

OTHER PUBLICATIONS

Yap, Kok-Kiong, et al., "Taking the Edge off with Espresso: Scale, Reliability and Programmability for Global ntemet Peering," SIGCOMM '17: Proceedings of the Conference of the ACM Special Interest Group on Data Communication, Aug. 21-25, 2017, 14 pages, Los Angeles, CA.

Del Piccolo, Valentin, et al., "A Survey of Network Isolation Solutions for Multi-Tenant Data Centers," IEEE Communications Surveys and Tutorials, Apr. 20, 2016, vol. 18, No. 4, 27 pages, IEEE.

Lasserre, Marc, et al., "Framework for Data Center (DC) Network Virtualization," RFC 7365, Oct. 2014, 26 pages, IETF.

Lin, Weidong, et al., "Using Path Label Routing in Wide Area Software-Defined Networks with Open Flow," 2016 International Conference on Networking and Network Applications, Jul. 2016, 6 pages, IEEE.

Non-Published Commonly Owned U.S. Appl. No. 17/240,890, filed Apr. 26, 2021, 325 pages, VMware, Inc.

Non-Published Commonly Owned U.S. Appl. No. 17/240,906, filed Apr. 26, 2021, 18 pages, VMware, Inc.

Non-Published Commonly Owned U.S. Appl. No. 17/467,378, filed Sep. 6, 2021, 157 pages, VMware, Inc.

Non-Published Commonly Owned U.S. Appl. No. 17/474,034, filed Sep. 13, 2021, 349 pages, VMware, Inc.

Guo, Xiangyi, et al., (U.S. Appl. No. 62/925,193) filed Oct. 23, 2019, 26 pages.

Non-Published Commonly Owned U.S. Appl. No. 17/542,413, filed Dec. 4, 2021, 173 pages, VMware, Inc.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Non-published Commonly Owned U.S. Appl. No. 17/187,913, filed Mar. 1, 2021, 27 pages, Nicira, Inc.

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

Barozei, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Non-Published Commonly Owned U.S. Appl. No. 17/562,890, filed Dec. 27, 2021, 36 pages, Nicira, Inc.

Non-Published Commonly Owned U.S. Appl. No. 17/572,583, filed Jan. 10, 2022, 33 pages, Nicira, Inc.

Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.

\* cited by examiner

METHODS AND APPARATUS FOR APPLICATION AWARE HUB CLUSTERING TECHNIQUES FOR A HYPER SCALE SD-WAN

BACKGROUND

Today, single clusters of forwarding hub nodes in software-defined wide area networks (SD-WANs) are tied to fixed scale-out ratios. For example, an N node cluster would have a scale out factor of 1:N as a fixed ratio. If the first assigned cluster node is overloaded, the next node (i.e., second node) in the cluster takes over, and so on until the span reaches all available N nodes. The clustering services today are oblivious to application requirements and bind a rigid scheme for providing clustering services to multiple peering edge nodes (e.g., in a hub and spoke topology). In this manner, a high priority real time application traffic flow is treated the same way as that of a low priority (e.g., bulk) traffic flow with respect to the scale out ratio within the cluster. This can subsequently lead to sub-optimal performance for provisioning and load balancing traffic within the cluster, and, in some cases, under-utilization of cluster resources.

BRIEF SUMMARY

Some embodiments provide a software-defined wide area network (SD-WAN) that includes a first branch location (first branch) and a datacenter location (datacenter). The datacenter includes multiple forwarding hub nodes, while the branch site includes at least one edge forwarding node. The edge node of the branch site receives a packet of a particular flow, the packet having a flow attribute. The edge node uses the flow attribute of the packet to identify a hub-selection rule from multiple hub-selection rules, each of which identifies a set of one or more forwarding hub nodes of the datacenter for receiving one or more flows from the branch site. At least one hub-selection rule identifies at least one forwarding hub node that is unique to the hub-selection rule (i.e., not identified by another hub-selection rule). The edge node uses the identified hub-selection rule to identify a forwarding hub node for the particular flow, and sends the packet from the branch site to the identified forwarding hub node of the datacenter.

In some embodiments, the forwarding hub nodes serve as gateways of the SD-WAN that provide access from the first branch site to other branch sites or third-party datacenters. The third party datacenters, in some embodiments, include software as a service (SaaS) datacenters (e.g., datacenters for video conferencing SaaS providers, for middlebox (e.g., firewall) service providers, for storage service providers, etc.). In some embodiments, the branch sites and third party datacenters are topologically arranged around the datacenter in a hub and spoke topology such that traffic between two sites passes through the forwarding hub nodes at the datacenter (i.e., regardless of the geographic location of the sites).

Conjunctively, or alternatively, the forwarding hub nodes in some embodiments provide branch sites with access to compute, storage, and service resources of the datacenter. Examples of such resources include compute machines (e.g., virtual machines and/or containers providing server operations), storage machines (e.g., database servers), and middlebox service operations (e.g., firewall services, load balancing services, encryption services, etc.). In some embodiments, the connections between the first branch site and the datacenter hub nodes are secure encrypted connections that encrypt packets exchanged between the edge node of the first branch site and the datacenter hub nodes. Examples of secure encrypted connections used in some embodiments include VPN (virtual private network) connections, or secure IPsec (Internet Protocol security) connections.

In some embodiments, the branch edge node identifies a hub-selection rule for a received packet by matching flow attributes of the packet with match criteria of a hub-selection rule, which associates the match criteria with one or more identifiers of one or more forwarding hub nodes of the datacenter. The match criteria of the hub-selection rules are defined in terms of flow attributes, according to some embodiments. The flow attributes that are used for the match operation in some embodiments include the received packet's flow identifier (e.g., the received packets five tuple identifier, i.e., source and destination Internet Protocol (IP) addresses/port numbers and protocol).

Conjunctively, or alternatively, the flow identifier used for the match operation in some embodiments includes flow attributes other than layers 2-4 (L2-L4) header values, such as layer 7 (L7) attributes. Examples of L7 attributes include AppID (e.g., traffic type identifier), user identifier, group identifier (e.g., an activity directory (AD) identifier), threat level, and application name/version. To obtain the L7 attributes, some embodiments perform deep packet inspection (DPI) on the packet.

By using L7 attributes to define the match criteria of hub-selection rules, some embodiments allow flows to be forwarded to different forwarding hub nodes based on different contextual attributes associated with the flows (i.e., allocating different forwarding hub nodes for different categories of flows). For instance, in some embodiments, the hub-selection rules associate different sets of flows that contain different types of traffic (as identified by different AppIDs) with different sets of forwarding hub nodes. Allocating the forwarding hub nodes based on L7 attributes, in some embodiments, allows for certain categories of traffic to be prioritized over other categories of traffic. For example, a first category of flows that contains a first type of traffic determined to be a high priority type of traffic (e.g., VoIP) may be allocated more forwarding hub nodes than a second category of flows that contains a second type of traffic determined to be a low priority type of traffic.

As mentioned above, the match criteria of one or more hub-selection rules can be defined in terms of other L7 contextual attributes, such as user identifier, group identifier, threat level, and application name/version. For example, in some embodiments, the hub-selection rules associate sets of flows having user identifiers that correspond to executive staff or financial staff with a first set of forwarding hub nodes, while associating sets of flows having user identifiers other than those that correspond to executive staff or financial state with a second set of forwarding hub nodes.

The hub-selection rules, in some embodiments, each identify a different group of forwarding hub nodes available for selection (e.g., available for processing flows in the same category as the matching packet). Accordingly, in some embodiments, when a matching hub-selection rule is found, the edge node selects a forwarding hub node from the group of forwarding hub nodes identified by the hub-selection rule. In some embodiments, the edge node relies on load balancing criteria (e.g., weight values) along with load balancing policies (e.g., round robin, etc.) to select a forwarding hub node from the group.

In some embodiments, a controller for the SD-WAN provides the hub-selection rules to the branch edge node. The controller receives network traffic statistics from the forwarding hub nodes, aggregates the received statistics by flow category, and analyzes the statistics to identify flow categories that need additional, or fewer, forwarding hub nodes in their respective forwarding hub node groups. In some embodiments, the controller determines that additional or fewer forwarding hub nodes are needed for processing a particular category of flows when a volume of traffic associated with the particular category of flows is found to exceed a maximum threshold value for traffic or fall below a minimum threshold value for traffic. When the controller determines that additional forwarding hub nodes are needed for a particular flow category, the controller directs a manager (e.g., a server) of the datacenter to generate the additional forwarding hub nodes, according to some embodiments. Conversely, when the controller determines in some embodiments that fewer forwarding hub nodes are needed for a particular flow category, the controller may reallocate the excess forwarding hub nodes to other flow categories.

When the controller directs the manager of the datacenter to generate additional forwarding hub nodes, in some embodiments, the controller sends an updated list of forwarding hub node groups to the branch edge node. In some embodiments, the updated list is provided via updated hub-selection rules (e.g., with updates to the forwarding hub node groups specified for each hub-selection rule). The forwarding hub node groups specified for each hub-selection rule, in some embodiments, are identified by group identifiers. Thus, the controller in some embodiments simply provides updated group identifiers to the edge nodes. Conversely, or alternatively, the controller in some embodiments provides the updated group identifiers as updated hub-selection rules that reference the updated group identifiers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a software-defined wide area network (SD-WAN) that includes one or more branch sites (branch locations) and a datacenter (datacenter location). The datacenter includes multiple forwarding hub nodes (referred to as "hubs" below), while each of the branch sites includes at least one edge node. In some embodiments, edge nodes are deployed at each of the branch sites in high-availability pairs such that each branch site includes an active edge node and a standby edge node in case of failure. The edge nodes of the branch sites receive packets of flows, the packets having flow attributes. The edge nodes use the flow attributes of the packets to identify hub-selection rules from multiple hub-selection rules, each of which identifies a set of one or more hubs of the datacenter for receiving one or more flows from the branch sites and includes match criteria defined in terms of flow attributes. In some embodiments, at least one hub-selection rule identifies at least one hub that is unique to the hub-selection rule (i.e., not identified by another hub-selection rule). The edge nodes use the identified hub-selection rules to identify hubs for the flows, and send the packets from the branch sites to the identified hubs of the datacenter (i.e., according to the identified hub-selection rules).

Figure 1:
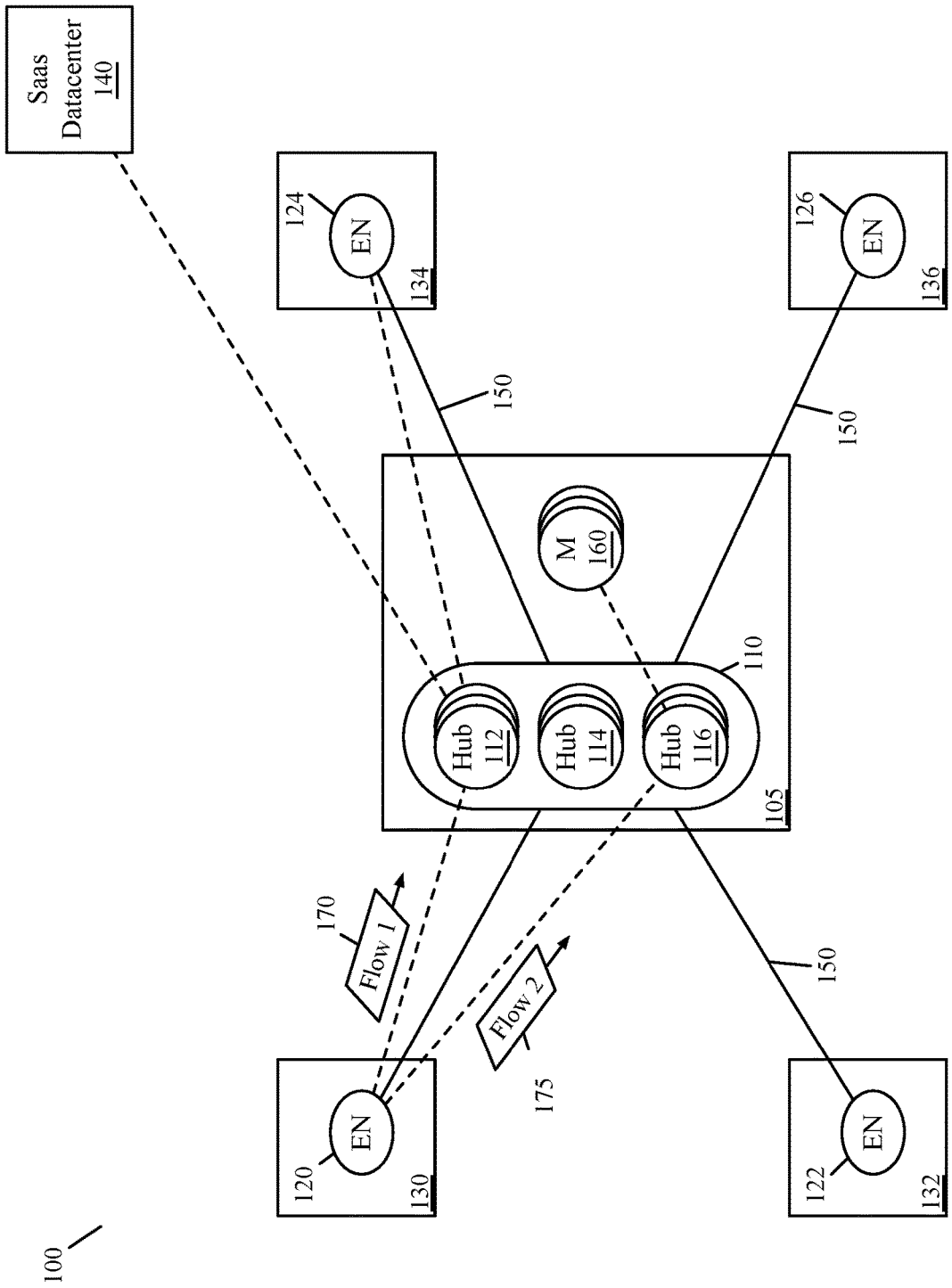
FIG. 1 conceptually illustrates an example of an SD-WAN that includes multiple branch sites that connect to hubs of a datacenter, according to some embodiments.

FIG. 1 conceptually illustrates an SD-WAN network (also referred to as a virtual network below) for connecting multiple branch sites to each other and to resources of a centralized datacenter. In this example, the SD-WAN 100 is created for connecting the branch sites 130-136 to each other and to resources 160 of the datacenter 105 (datacenter), as well as the SaaS datacenter 140, via the sets of hubs 112-116 (also referred to herein as forwarding hub nodes) of the hub cluster 110. The SD-WAN 100 is established by a controller cluster (not shown), the sets of hubs 112-116, and four edge nodes 120-126, one in each of the branch sites 130-136.

The edge nodes in some embodiments are edge machines (e.g., virtual machines (VMs), containers, programs executing on computers, etc.) and/or standalone appliances that operate at multi-computer locations of the particular entity (e.g., at an office or datacenter of the entity) to connect the computers at their respective locations to the hubs and other edge nodes (if so configured). In some embodiments, the edge nodes are clusters of edge nodes at each of the branch sites. In other embodiments, the edge nodes are deployed to each of the branch sites as high-availability pairs such that one edge node in the pair is the active edge node and the other edge node in the pair is the standby edge node that can take over as the active edge node in case of failover. Also, in this example, the sets of hubs 112-116 are deployed as machines (e.g., VMs or containers) in the same public datacenter 105. In other embodiments, the hubs may be deployed in different public datacenters.

An example of an entity for which such a virtual network can be established includes a business entity (e.g., a corporation), a non-profit entity (e.g., a hospital, a research organization, etc.), an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In other embodiments, the hubs can also be deployed in private cloud datacenters of a virtual WAN provider that hosts hubs to establish SD-WANs for different entities.

In the example of FIG. 1, the hubs are multi-tenant forwarding elements that can be used to establish secure connection links (e.g., tunnels) with edge nodes at the particular entity's multi-computer sites, such as branch sites (branch offices), datacenters (e.g., third party datacenters), etc. For example, the sets of hubs 112-116 in the cluster 110 provide access from each of the branch sites 130-136 to each of the other branch sites 130-136, as well as to the SaaS datacenter 140, via the connection links 150, which terminate at the cluster 110 as shown. These multi-computer sites are often at different physical locations (e.g., different buildings, different cities, different states, etc.), according to some embodiments. In some embodiments the forwarding hub nodes can be deployed as physical nodes or virtual nodes. Additionally, the forwarding hub nodes can be deployed on the premises of a datacenter premises in some embodiments, while in other embodiments, the forwarding hub nodes can be deployed on a cloud (e.g., as a set of virtual edges configured as a cluster).

Additionally, the example of FIG. 1, the sets of hubs 112-116 also provide access to resources 160 (e.g., machines) of the datacenter 105. More specifically, the set of hubs 116 provides access to the resources 160. The resources in some embodiments include a set of one or more servers (e.g., web servers, database servers) within a microservices container (e.g., a pod). Conjunctively, or alternatively, some embodiments include multiple such microservices containers, each accessible through a different set of one or more hubs of the datacenter. The resources, as well as the hubs, are within the datacenter premises, according to some embodiments.

The edge nodes 120-126 are forwarding elements that exchange packets with one or more hubs and/or other edge nodes through one or more secure connection links, according to some embodiments. In this example, all secure connection links of the edge nodes are with the sets of hubs 112-116. FIG. 1 also illustrates that through the set of hubs 112, the SD-WAN 100 allows the edge nodes to connect to the SaaS datacenter 140. While not shown, some embodiments include multiple different SaaS datacenters, which may each be accessible via different sets of hubs, according to some embodiments. In some embodiments, the SaaS datacenters include datacenters for video conferencing SaaS providers, for middlebox (e.g., firewall) service providers, for storage service providers, etc. As shown, the branch sites 130-136 and SaaS datacenter 140 are topologically arranged around the datacenter 105 in a hub and spoke topology. Thus, traffic between any two sites must pass through the sets of hubs 112-116 at the datacenter 105 regardless of the geographic location of the sites.

The sets of hubs 112-116 in some embodiments provide the branch sites 130-136 with access to compute, storage, and service resources of the datacenter, such as the resources 160. Examples of such resources include compute machines (e.g., virtual machines and/or containers providing server operations), storage machines (e.g., database servers), and middlebox service operations (e.g., firewall services, load balancing services, encryption services, etc.). In some embodiments, the connections between the branch sites and the datacenter hubs are secure encrypted connections that encrypt packets exchanged between the edge nodes of the branch sites and the datacenter hubs. Examples of secure encrypted connections used in some embodiments include VPN (virtual private network) connections, or secure IPsec (Internet Protocol security) connections.

In some embodiments, multiple secure connection links (e.g., multiple secure tunnels) can be established between an edge node and a hub. When multiple such links are defined between an edge node and a hub, each secure connection link, in some embodiments, is associated with a different physical network link between the edge node and an external network. For instance, to access external networks in some embodiments, an edge node has one or more commercial broadband Internet links (e.g., a cable mode and a fiber optic link) to access the Internet, a wireless cellular link (e.g., a 5G LTE network), etc.

In some embodiments, each secure connection link between a hub and an edge node is formed as a VPN tunnel between the hub and the edge node. As illustrated in FIG. 1, the set of hubs 112 also connects the edge nodes to the SaaS datacenter 140. In some embodiments, these connections are through secure VPN tunnels. The collection of the edge nodes, hubs, and secure connections between the edge nodes, hubs, and SaaS datacenters forms the SD-WAN 100 for the particular entity.

As the sets of hubs 112-116 are multi-tenant hubs, they are used to define other virtual networks for other entities (e.g., other companies, organizations, etc.), according to some embodiments. Some such embodiments store tenant identifiers in tunnel headers that encapsulate packets that are to traverse the tunnels that are defined between a hub and branch sites, or other datacenters, to differentiate packet flows that it receives from edge nodes of one entity from packet flows that it receives along other tunnels of other entities. In other embodiments, the hubs are single tenant and are specifically deployed to be used by just one entity.

As mentioned above, the edge nodes of some embodiments forward packets to the hubs based on hub-selection rules that each identify a set of one or more hubs (e.g., the sets of hubs 112-116) of the datacenter for receiving one or more flows from the branch sites. In some embodiments, the edge nodes use flow attributes of received packets to identify hub-selection rules. The edge nodes identify hub-selection rules for received packets by matching flow attributes of the received packets with the match criteria of the hub-selection, which associate the match criteria with one or more identifiers of one or more forwarding hub nodes of the datacenter, according to some embodiments. For example, FIG. 1 depicts two flows 170 and 175 that both originate at the edge node 120 of the branch site 130. The first flow 170 is forwarded to the set of hubs 112, which provide access to the SaaS datacenter 140, while the second flow 175 is forwarded to the set of hubs 116 which provide access to the set of resource machines 160 of the datacenter 105.

The match criteria of the hub-selection rules in some embodiments are defined in terms of flow attributes. The flow attributes that are used for the match operation in some embodiments include the received packet's flow identifier (e.g., the received packets five tuple identifier, i.e., source and destination Internet Protocol (IP) addresses/port numbers and protocol). Conjunctively, or alternatively, the flow identifier used for the match operation in some embodiments includes flow attributes other than layers 2-4 (L2-L4) header values, such as layer 7 (L7) attributes. Examples of L7 attributes include AppID (e.g., traffic type identifier), user identifier, group identifier (e.g., an activity directory (AD) identifier), threat level, and application name/version. To obtain the L7 attributes, some embodiments perform deep packet inspection (DPI) on the packet. Alternatively, some embodiments may utilize a context engine to collect L7 attributes, as will be further described below.

By using L7 attributes to define the match criteria of hub-selection rules, some embodiments allow flows to be forwarded to different hubs based on different contextual attributes associated with the flows (i.e., allocating different hubs for different categories of flows). For instance, in some embodiments, the hub-selection rules associate different sets of flows that contain different types of traffic (i.e., as identified by different AppIDs) with different sets of hubs. Allocating the hubs based on L7 attributes, in some embodiments, allows for certain categories of traffic to be prioritized over other categories of traffic. For example, a first category of flows that contains a first type of traffic determined to be a high priority type of traffic (e.g., VoIP) may be allocated more hubs than a second category of flows that contains a second type of traffic determined to be a low priority type of traffic. Some embodiments also add attributes to traffic flows to signify that the traffic is of a higher priority for influencing hub-selection rules. For example, some embodiments include the location (e.g., latitude/longitude, geographic location) of the edge node as an additional attribute for influencing hub-selection rules.

As mentioned above, the match criteria of one or more hub-selection rules can be defined in terms of other L7 contextual attributes, such as user identifier, group identifier, threat level, and application name/version. For example, in some embodiments, the hub-selection rules associate sets of flows having user identifiers that correspond to executive staff or financial staff with a first set of forwarding hub nodes, while associating sets of flows having user identifiers other than those that correspond to executive staff or financial state with a second set of hubs. Doing so, in some embodiments, results in decreased congestion, and allows for easier prioritization of network traffic by allocating hubs based on attributes of flows such that certain flow categories requiring a greater number of hubs or resources can be provided with such.

In some embodiments, different hub-selection rules identify different groups of hubs that are available for selection for flows that match the rules. Accordingly, in some embodiments, when a matching hub-selection rule is identified for a received packet's flow, the edge node selects a hub from the group of hubs identified by the matched hub-selection rule. In some embodiments, the edge node performs a load balancing operation that based on a set of load balancing criteria (e.g., weight values) distributes the flows that match a hub-selection rule amongst the hubs specified by the rule.

For instance, the load balancing operation in some embodiments uses the weight values to distribute the flows that match a hub-selection rule amongst this rule's specified hubs in a round robin fashion (e.g., for three weight values of 2, 3, 3 for three hub, the load balancing operation would distribute the first two matching flows to the first hub, the next three matching flows to the second hub, the next three matching flows to the third hub, and then repeats by going back to the first hub for the next two flows).

The load-balancing weight values in some embodiments are adjusted dynamically based on packet processing statistics collected from the edge nodes and/or hubs in some embodiments. These statistics are collected and distributed in some embodiments by the controller cluster (not shown) of the SD-WAN. The controller cluster in some embodiments also distributes the hub-selection. The controller cluster and its operation will be described in further detail below.

Figure 2:
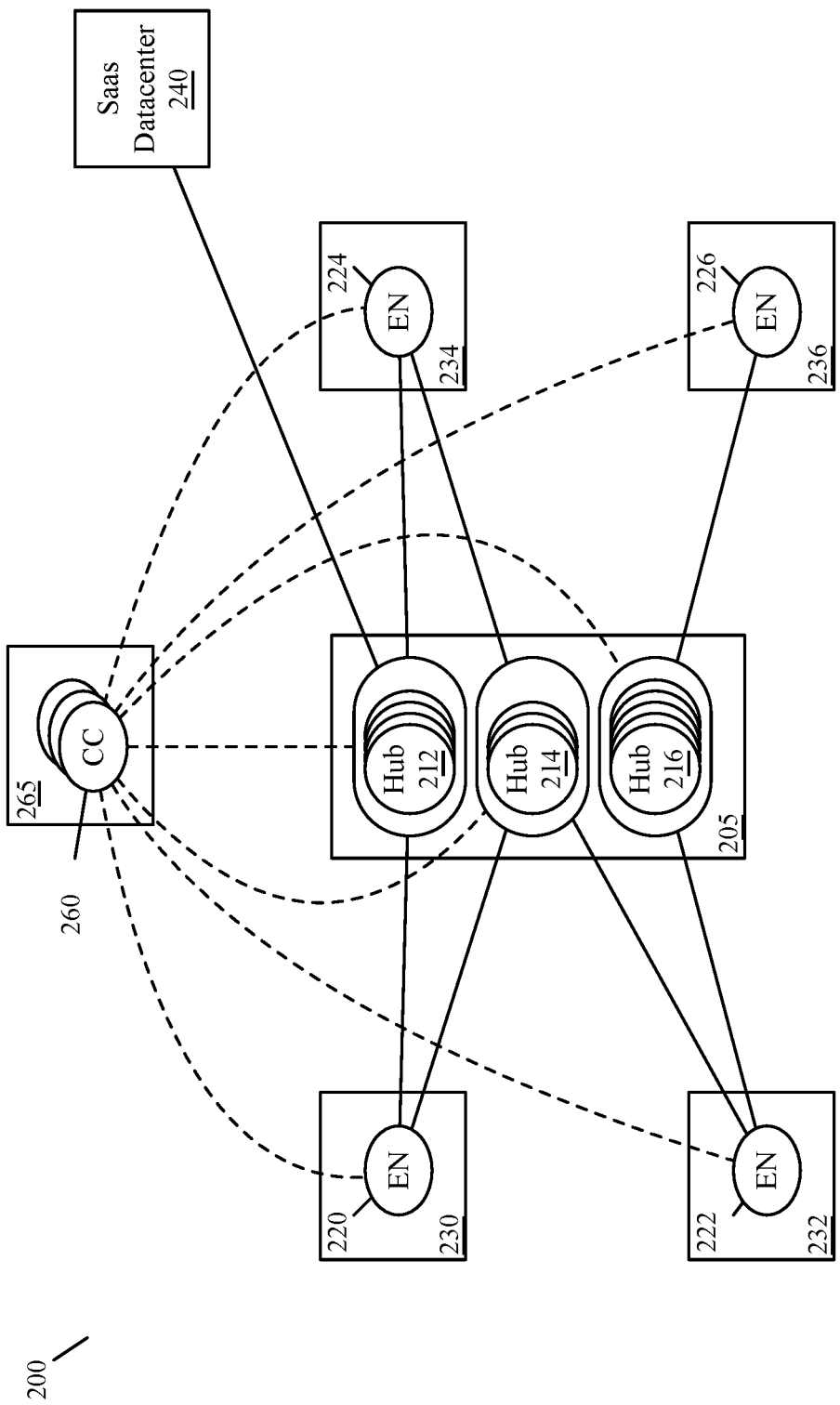
FIG. 2 conceptually illustrates another example of an SD-WAN that includes a controller cluster for configuring the components of the SD-WAN, according to some embodiments.

FIG. 2 illustrates an SD-WAN network 200 for connecting multiple branch sites 230-236 to each other and to resources of a centralized datacenter 205. In this example, the SD-WAN 200 is established by the controller cluster 260 in the private datacenter 265, the hub clusters 212-216, and four edge nodes 220-226, one in each of the branch sites 230-236.

The controller cluster 260 severs as a central point for managing (e.g., defining and modifying) configuration data that is provided to the edge nodes and/or hubs to configure some or all of the operations. In some embodiments, the controller cluster has a set of manager servers that define and modify the configuration data, and a set of controller servers that distribute the configuration data to the edge nodes and/or hubs. In other embodiments, the controller cluster only has one set of servers that define, modify, and distribute the configuration data. The controller cluster, in some embodiments, directs edge nodes to use certain hubs for different categories of flows, as will be described in further detail below.

Although FIG. 2 illustrates the controller cluster 260 residing in one private datacenter 265, the controller cluster in some embodiments resides in one or more public cloud datacenters and/or private cloud datacenters. Also, some embodiments deploy one or more hubs in one or more private datacenters (e.g., datacenters of the entity that deploys the hubs and provides the controller cluster for configuring the hubs to implement the virtual network(s)).

FIG. 2 further illustrates a set of hub groups 212-216 in the datacenter 205. Each hub group 212-216, in some embodiments, is designated for processing a different category of flows based on configuration by the controller cluster 260. For example, the hub group 212 is designated as the hub group for receiving flows associated with the SaaS datacenter 240 as illustrated. In some embodiments, flow categories having a higher priority are allocated more hubs than flow categories having a lower priority. For example, each of the hub groups 212-216 includes a different number of hubs, with the hub group 216, having the highest number of hubs. In some embodiments, the number of hubs allocated for each flow category is based on input from a user (e.g., network administrator).

As mentioned above, in some embodiments, the controller cluster 260 (controller) for the SD-WAN provides hub-selection rules to the edge nodes 220-226 at the branch sites 230-236 for selecting hubs and/or hub groups to which to send packets of flows. The hubs of the hub groups, in some embodiments, are configured to provide network traffic statistics to the controller cluster collected from flows received by the hubs. In some embodiments, the configuration for the hubs specifies to provide the statistics periodically.

The controller cluster 260 receives network traffic statistics from the hubs of the hub groups 212-216, aggregates the received statistics by flow category (e.g., by AppID, user identifier, etc.), and analyzes the statistics to identify flow categories that require additional, or fewer, hubs in their respective hub groups. For example, in some embodiments, the controller cluster 260 determines that additional hubs are needed for processing a particular category of flows when a volume of traffic associated with the particular category of flows is found to exceed a maximum threshold value for traffic, or fall below a minimum threshold value for traffic. The maximum and minimum threshold values, in some embodiments, are defined by a user (e.g., network administrator).

When the controller cluster 260 determines that additional hubs are needed for a particular flow category, the controller directs a manager (not shown) of the datacenter to generate the additional hubs, according to some embodiments. Conversely, when the controller determines in some embodiments that fewer hubs are needed for a particular flow category, the controller may remove the excess hubs from the hub group designated for the particular flow category. In some embodiments, the controller may reallocate the excess hubs for other flow categories.

When the controller directs the manager of the datacenter to generate additional hubs, in some embodiments, the controller cluster 260 sends an updated list of hub groups to the edge nodes 220-226. In some embodiments, the updated list is provided via updated hub-selection rules (e.g., with updates to the hub groups specified for each hub-selection rule). The hub groups specified for each hub-selection rule, in some embodiments, are identified using group identifiers. Thus, the controller cluster in some embodiments simply provides updated group identifiers to the edge nodes. Conversely, or alternatively, the controller cluster in some embodiments provides the updated group identifiers as updated hub-selection rules that reference the updated group identifiers. The addition and removal of hubs will be further discussed below by reference to FIG. 5.

Figure 3:
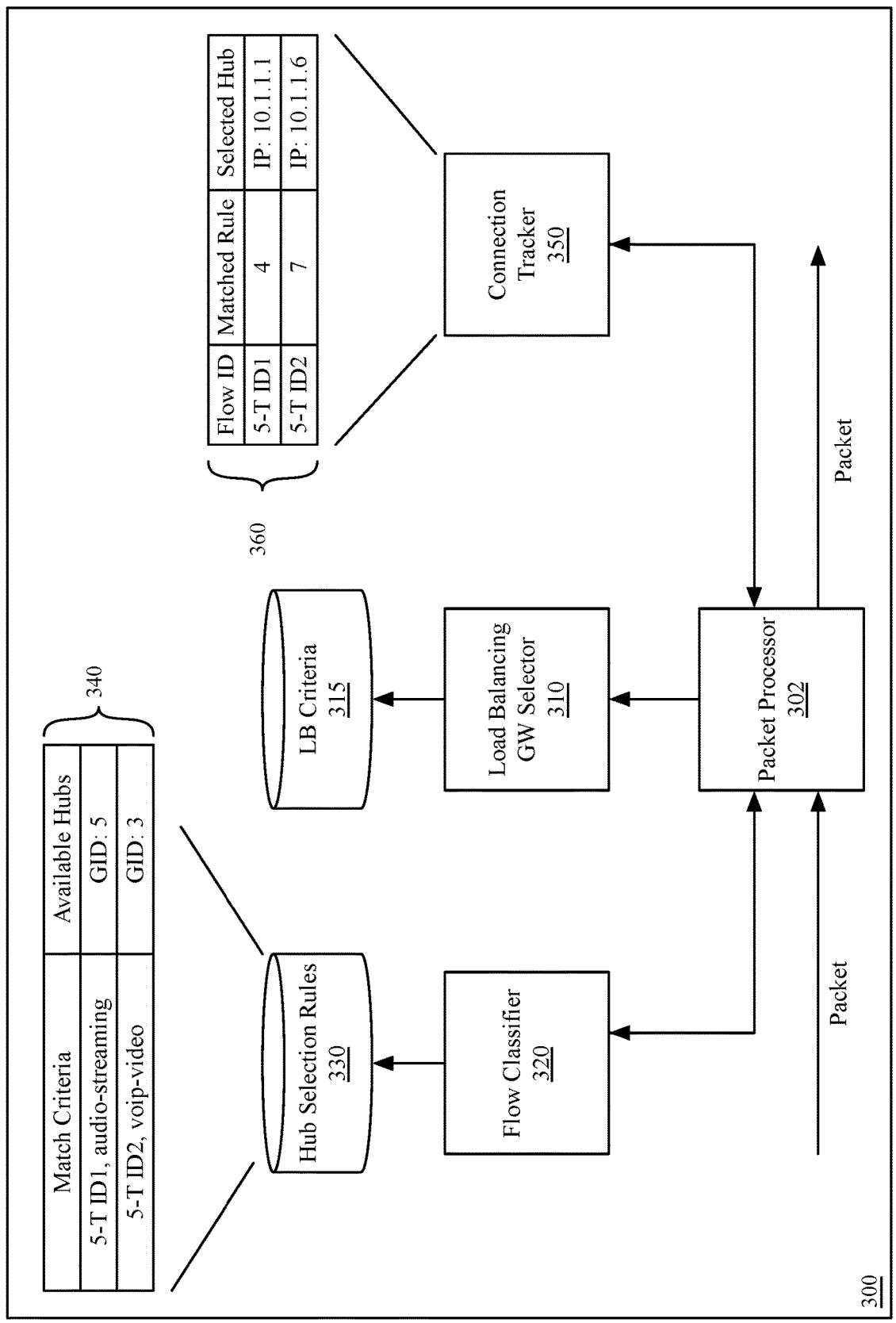
FIG. 3 conceptually illustrates example components of an edge node of a branch site, according to some embodiments.

FIG. 3 conceptually illustrates example of an edge node 300 of some embodiments of the invention. As shown, the edge node 300 includes a packet processor 302, a load balancing hub selector 310, a flow classifier 320, and a connection tracker 350. In some embodiments, the components of the edge node operate on a single machine, while in other embodiments (e.g., when the edge node is a cluster of edge nodes) they operate on separate machines.

The packet processor 302 is the forwarding engine of the edge forwarding node of some embodiments. For a received packet of a flow, the packet processor 302 in some embodiments first determines whether the connection tracker 350 includes any records relating to the flow. The connection tracker stores records 360 for flows that have been previously processed by the edge node. In the example illustrated in FIG. 3, the stored records 360 of the connection tracker 350 include flow identifiers (e.g., five tuple identifiers), matched hub-selection rule for the flows, and the IP addresses of the selected hubs for the flows. While each of the flow IDs are illustrated as having one selected hub per flow, other embodiments may include a list of two or more hubs that have been selected for different packets of the same flow. In other words, in some embodiments, hubs are selected on a per flow basis, while in other embodiments, hubs are selected on a per packet basis. For example, in some embodiments, the records of the connection tracker 350 are updated as additional packets of the same flow are processed and forwarded by the edge node. The updated records in some embodiments include statistics regarding the number of packets in a flow forwarded to each hubs.

When the packet processor 302 determines that the connection tracker has a record that matches the received packet's flow (e.g., determines that the packet's five-tuple identifier matches the five-tuple identifier of a record in the connection tracker), the packet processor selects a hub for the packet by selecting a hub specified in the matching connection-tracking record. On the other hand, when the packet processor 302 determines that the connection tracker does not store any record relating to the received packet's flow, the packet processor 302 in some embodiments uses the flow classifier 320 to identify a hub-selection rule that specifies one or more hubs to use for the received packet's flow.

The flow classifier 320, in some embodiments, matches attributes of flows with match criteria of hub-selection rules 340 stored in the storage 330. As illustrated, the hub-selection rules 340 include a match criteria and a corresponding list of available hubs. Match attributes in some embodiments are defined in terms of (1) five-tuple header values (i.e., source IP address, source port address, destination IP address, destination port address, and protocol) of the packet flows, and/or (2) contextual attributes associated with the packet flows. In this example, the match criteria are defined in terms of both five-tuple identifiers and traffic types. In some embodiments, some or all of the five-tuple header values can be specified as wildcard values.

Also, in this example, each rule specifies its list of hubs by specifying a hub group identifier (GID), with each hub group's GID being an index into another data store that specifies the identifiers (e.g., IP addresses) of the hubs in that group. For example, rule 1 of the hub-selection rules 340 (1) matches flows that header values that match 5-tuple ID1 and carrying audio streaming content, and (2) specifies the corresponding hub group GID 5. Thus, flows with matching five-tuple identifiers and having an AppID identifying audio-streaming as the traffic type of the flow are to be forwarded to the hubs of hub group 5. Conjunctively, or alternatively, some embodiments list available hubs in each hub group by listing their individual network addresses (i.e., IP addresses) in the hub-selection rule, instead of providing the group D. Similarly, the match criteria of some embodiments may use a different contextual attribute for match criteria other than traffic type, or a combination of two or more contextual attributes.

In some embodiments, to select a hub from the available hubs indicated by the matched hub-selection rule, the packet processor 302 uses the load balancing hub selector 310. The load balancing hub selector 310, in some embodiments, performs load balancing operations to identify and select hubs to which to forward packets. In some embodiments, the load balancing hub selector 310 uses the load balancing criteria stored in storage 315 to perform its load balancing and hub-selection operations.

The edge node performs its load balancing operations in order to distribute the flows that match a hub-selection rule amongst the hubs specified by the rule. For instance, the load balancing operation in some embodiments uses the weight values to distribute the flows that match a hub-selection rule amongst this rule's specified hubs in a round robin fashion (e.g., for three weight values of 2, 3, 3 for three hub, the load balancing operation would distribute the first two matching flows to the first hub, the next three matching flows to the second hub, the next three matching flows to the third hub, and then repeats by going back to the first hub for the next two flows). The weight values in some embodiments are periodically adjusted based on statistics regarding the packets processed by the hubs.

Figure 4:
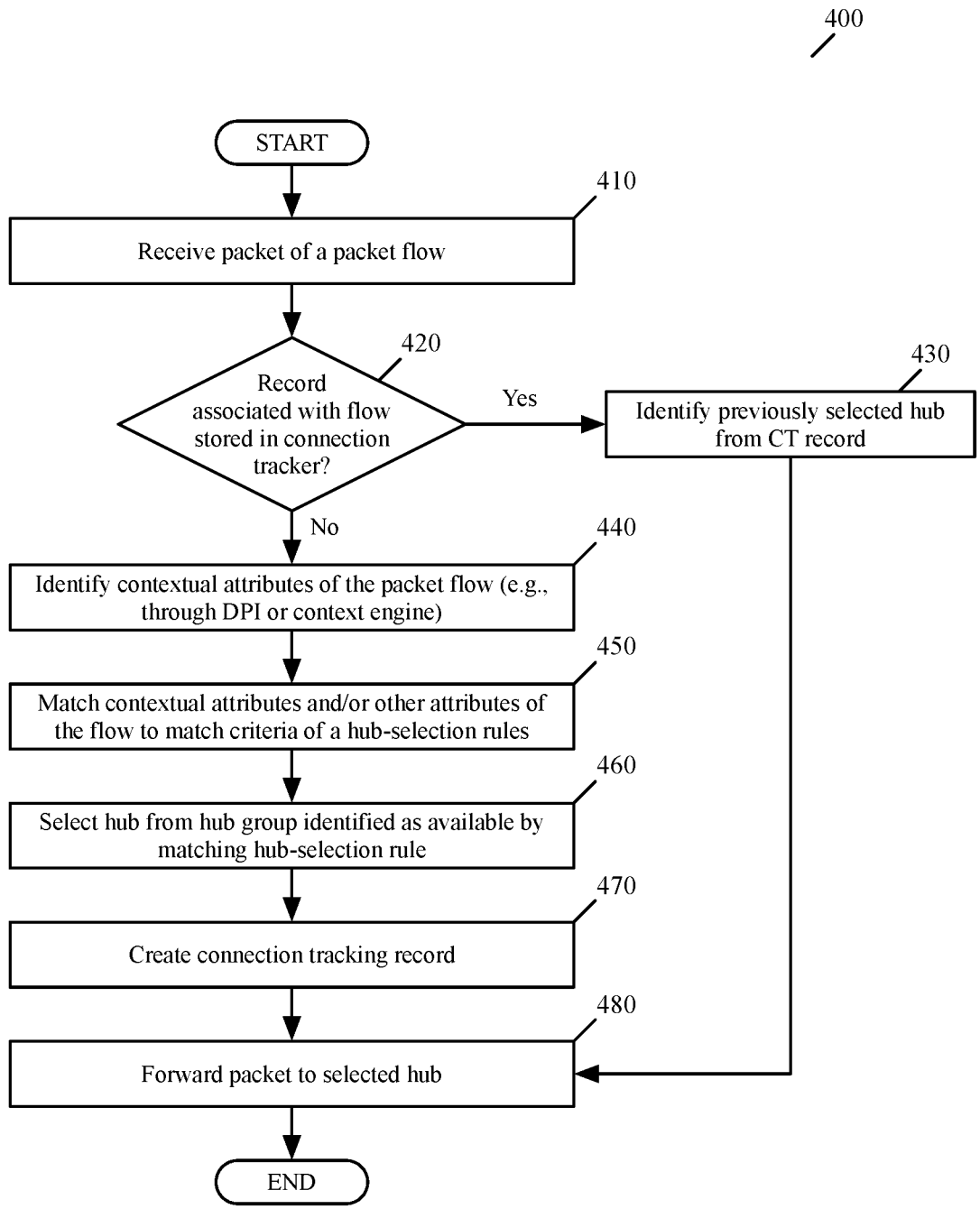
FIG. 4 illustrates a process for an edge node for selecting a hub to which to forward a packet, according to some embodiments.

FIG. 4 illustrates a process 400 for an edge node that receives a packet of a particular flow. As shown, the process 400 starts at 410 by receiving a packet that has a flow identifier associated with a particular packet flow. In some embodiments, the received packet may be the first packet of the flow, while in other embodiments, the packet may be a subsequent packet of the flow.

After receiving the packet at 410, the process 400 determines, at 420, whether a record associated with the particular flow is stored in a connection tracker. As described above for FIG. 3, the connection tracker (e.g., connection tracker 350), in some embodiments, stores records for flows that have been processed by the edge node. These stored records include the flow's identifier, an identified hub-selection rule for the flow, and one or more hubs to which packets of a flow have been forwarded, according to some embodiments, as described above. When a record associated with the particular flow is identified in the connection tracker, the process transitions to 430, where it identifies the hub previously selected for the flow from the connection-tracker record. The process then transitions to 480 to forward the packet to the selected hub.

Otherwise, when no records associated with the particular flow are stored in the connection tracker, the process transitions to 440 to identify contextual attributes of the packet flow. In some embodiments, the contextual attributes include AppID (e.g., traffic type identifier), user identifier, group identifier (e.g., an activity directory (AD) identifier), threat level, and application name/version. To identify the contextual attributes of received packets, some embodiments perform deep packet inspection (DPI) on the received packets. Alternatively, some embodiments utilize context engine that collects contextual attributes on the edge node through one or more guest introspection (GI) agents executing on the edge node. In some such embodiments, the context engine provides the collected contextual attributes to, e.g., a flow classifier such as flow classifier 320 of FIG. 3.

After identifying the contextual attributes of the received packet, the process 400 matches, at 450, the identified contextual attributes of the flow with match criteria of a hub-selection rule. As described above, the match criteria in some embodiments is defined in terms of flow attributes (e.g., contextual attributes). For instance, in the example of the edge node 300, the flow classifier 320 accesses the hub-selection rules from the storage 330 to match the identified contextual attributes with the match criteria listed for the hub-selection rules 340. In some embodiments, the hub-selection rules are received from a controller of the SD-WAN (e.g., the controller cluster 260) and each associate the match criteria with one or more identifiers of one or more hubs, or hub groups, of the datacenter as described above. The match criteria of the hub-selection rules, in some embodiments, are defined in terms of flow attributes.

Next, at 460, the process selects a hub from a hub group identified as available by the matching hub-selection rule. Some embodiments utilize group identifiers associated with the hub groups to identify available hub groups for each of the hub-selection rules, such as in the example embodiment of FIG. 3. In some embodiments, the controller (e.g., controller cluster 260) may provide, to the edge nodes (e.g., edge nodes 220-226), a mapping of the group identifiers to their respective hub groups for the edge nodes to use to identify particular hubs of the hub groups to which to send packets.

In some embodiments, such as FIG. 3, the load balancing hub selector of the edge node (e.g., the load balancing hub selector 310) is responsible for selecting the hub. For instance, as described above, the load balancing operation in some embodiments uses periodically adjusted weight values to distribute the flows that match a hub-selection rule amongst this rule's specified hubs in a round robin fashion.

In some embodiments, for packets belonging to flows having corresponding records stored by the connection tracker, the same hub may be selected for the current packet of the flow. However, as will be described in further detail below, the available hubs in each hub group are dynamically assigned, and thus may change between the processing of different packets of a flow. Accordingly, in some embodiments, a hub selected for one packet of a flow may no longer be available for selection for a subsequent packet of the flow. In some such embodiments, the load balancing hub selector may select a next available hub from the available hubs identified by the matched hub selection rule for the flow.

After selecting a hub, the process proceeds to 470 to create a record in the connection-tracking storage 360 to identify the hub selected for the flow. For example, in some embodiments, the created connection-tracking record includes the flow's identifier, the matched hub-selection rule, and the hub(s) selected for the flow. Each time the process 400 matches a packet with a connection-tracking record, the process in some embodiments updates the connection tracker with other information regarding the particular flow. For example, in some embodiments, the process updates the existing record to reflect the hub selected for the received packet (i.e., if the selected hub is a hub other than those already reflected in the record).

After creating the connection-tracking record, the process forwards (at 480) the packet to the selected hub. As described above, the edge nodes in some embodiments forward packets to selected hubs using direct tunnels established between the edge nodes and the hubs and/or hub groups. In some embodiments, multiple secure connection links (e.g., multiple secure tunnels) can be established between an edge node and a hub. When multiple such links are defined between an edge node and a hub, each secure connection link, in some embodiments, is associated with a different physical network link between the edge node and an external network. For instance, to access external networks in some embodiments, an edge node has one or more commercial broadband Internet links (e.g., a cable mode and a fiber optic link) to access the Internet, a wireless cellular link (e.g., a 5G LTE network), etc. In some embodiments, each secure connection link between a hub and an edge node is formed as a VPN tunnel between the hub and the edge node. The process 400 then ends.

Figure 5:
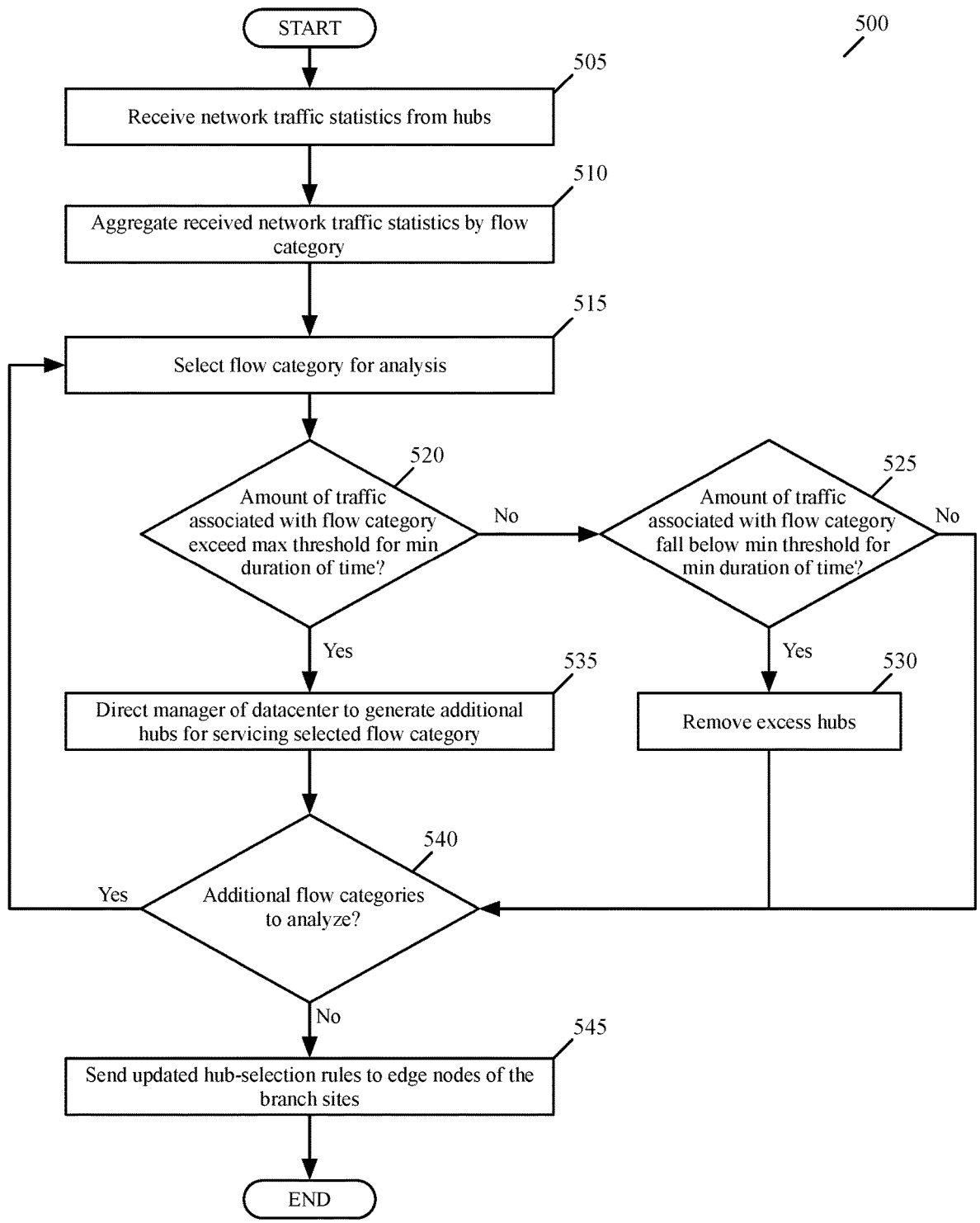
FIG. 5 illustrates a process for a controller that manages the configuration of edge nodes and hubs of an SD-WAN, according to some embodiments.

FIG. 5 illustrates a process 500 for a controller of an SD-WAN (e.g., controller cluster 260 of the SD-WAN 200). The process 500 starts, at 505, by receiving network traffic statistics from the hubs/hub groups of the datacenter (e.g., hub groups 212-216 of the datacenter 205). As described above, the hubs/hub groups are configured to provide network traffic statistics to the controller/controller cluster, according to some embodiments.

At 510, the process aggregates the received network traffic statistics by flow category. In some embodiments, the flows are categorized by traffic type (e.g., as identified by the AppID of packets). In some such embodiments, each traffic type has a designated priority level (e.g., high priority, low priority, etc.) that corresponds to the number of hubs that may be allocated for receiving flows of the traffic type. For example, in some embodiments, a first type of traffic designated as high priority may be allocated 70% of the hubs of the datacenter while a second type of traffic designated as low priority may be allocated the other 30% of the hubs of the datacenter. The number of hubs allocated for a particular traffic type is defined by a user (e.g., network administrator), according to some embodiments.

Once the received network traffic statistics have been aggregated, the process 500 selects, at 515, a flow category for analysis. Examples of flow categories can include categories based on AppID (e.g., traffic type), user identifiers (e.g., administrators, low-level employees, etc.), threat level (e.g., high, low, neutral, etc.), etc. In some embodiments, the flow categories are each assigned a priority level as described above. For example, some embodiments in which flows are categorized by traffic type may assign a high priority level to, e.g., VoIP traffic, while assigning a lower priority level to, e.g., peer-to-peer e-mail traffic.

Next, the process 500 determines, at 520, whether the amount of traffic associated with the selected flow category has exceeded a maximum threshold value specified for the flow category for a minimum duration of time (e.g., hours, days, weeks, etc.). The maximum threshold value and the minimum duration of time, in some embodiments, are each specified by a user (e.g., network administrator). In some embodiments, the maximum threshold value and the minimum duration of time specified may vary between each of the flow categories, while in other embodiments, they are consistent for each flow category.

When the process determines that the amount of traffic has not exceeded the maximum threshold value for the minimum specified duration of time, the process transitions to 525 to determine whether the amount of traffic has fallen below a minimum threshold for a minimum duration of time. In some embodiments, the minimum duration of time specified for the maximum threshold value and the minimum duration of time specified for the minimum threshold value are equal, while in other embodiments the specified minimum durations of time are different.

When the process determines, at 525, that the amount of traffic associated with the flow has fallen below the minimum threshold value for the minimum duration of time, the process transitions to 530 to remove the excess hubs from the group of hubs designated for the selected flow category. In some embodiments, removing the excess hubs includes reallocating the excess hubs for other flow categories (e.g., other flow categories that may require additional hubs). Otherwise, the process transitions to 540 to determine if there are additional flow categories to analyze.

Alternatively, when the process determines at 520 that the amount of traffic associated with the selected flow category has exceeded the maximum threshold value for the minimum duration of time, the process transitions to 535 to direct a manager of the datacenter (e.g., VeloCloud Orchestrator) to generate additional hubs to be added to the hub group allocated for servicing the selected flow category. In some embodiments, when a particular category of flows is found to have excess hubs as described above, those excess hubs may be allocated to a flow category determined to require additional hubs in conjunction with the newly generated hubs, or as an alternative to generating the new hubs.

Next, at 540, the process determines whether there are additional flow categories to analyze. When the process determines that there are additional flow categories, to analyze, the process transitions back to 515 to select a flow category for analysis. Otherwise, the process transitions to 545 to send updated hub-selection rules to the edge nodes of the branch sites, the updated hub-selection rules identifying any changes (e.g., additions, removals) to the hub groups. The process 500 then ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
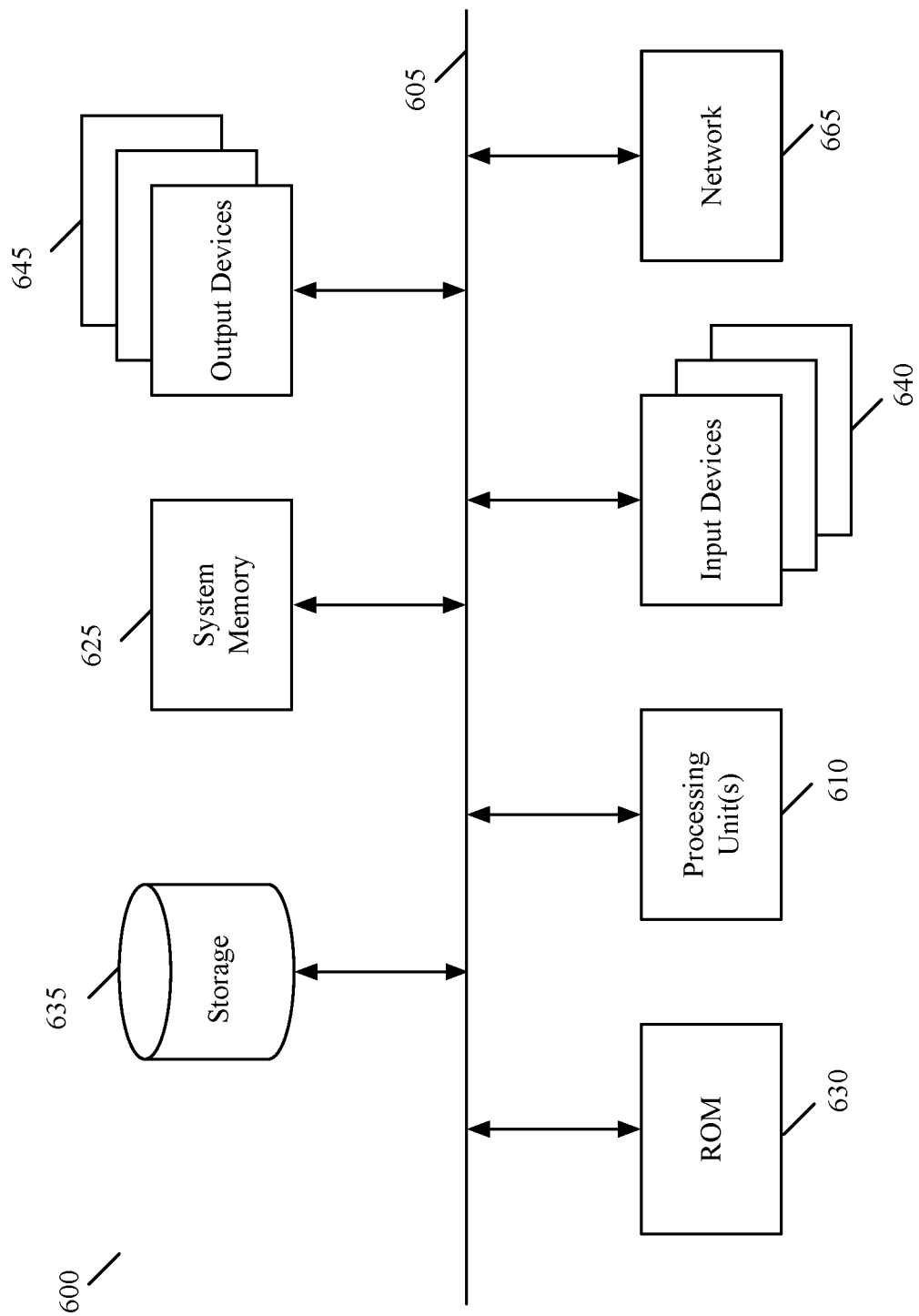
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, hub and edge forwarding elements. As such, it can be used to execute any of the above described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such as random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet), or a network of networks (such as the Internet). Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy hubs in public cloud datacenters. However, in other embodiments, the hubs are deployed in a third party's private cloud datacenters (e.g., datacenters that the third party uses to deploy cloud hubs for different entities in order to deploy virtual networks for these entities). Thus, one of ordinary skill in the art would understand that the invention is not to be limited by the foregoing illustrative details, but rather is to be defined by the appended claims.

The invention claimed is:

1. For a software-defined wide area network (SD-WAN) connecting first, second and third sites, the first and second sites being branch sites and respectively comprising first and second forwarding edges and the third site being a datacenter and comprising a plurality of forwarding hubs, a method comprising:
    at the forwarding edge of the first branch site,
        receiving a packet of a particular flow, the packet originating from the first branch site and addressed to a destination at the second branch site, the flow associated with a flow attribute;
        using the flow attribute to identify a hub-selection rule from a plurality of hub selection rules, each hub-selection rule identifying at least one particular forwarding hub at the datacenter third site for receiving one or more flows from the first branch site, and directing the received flow to the particular forwarding hub to forward to the second branch site, the datacenter third site comprising a plurality of server machines accessible to the first and second sites through the hubs, the plurality of hub-selection rules comprising at least one hub-selection rule identifying at least one forwarding hub that is not identified by another hub-selection rule;
        using the identified hub-selection rule to identify a forwarding hub for the particular flow; and
        sending the packet from the forwarding edge at the first branch site to the identified forwarding hub at the datacenter third site.

2. The method of claim 1, wherein the flow attribute comprises a five tuple identifier of the packet.

3. The method of claim 1, wherein the flow attribute comprises attributes other than layers 2-4 header values.

4. The method of claim 3 further comprising performing deep packet inspection (DPI) on the packet to identify the flow attribute, wherein the flow attribute comprises a layer 7 (L7) attribute of the packet.

5. The method of claim 4, wherein the L7 attribute identifies a traffic type of the particular flow.

6. The method of claim 1, wherein each hub-selection rule in the plurality of hub-selection rules specifies a different set of forwarding hubs for receiving flows of a particular flow category.

7. The method of claim 1, wherein each hub-selection rule in the plurality of hub-selection rules comprises match criteria defined in terms of flow attributes.

8. The method of claim 7, wherein using the flow attribute to identify a hub-selection rule comprises comparing the flow attribute to match criteria of the plurality of hub selection rules to identify a matching hub-selection rule.

9. The method of claim 1, wherein at least two hub-selection rules identify a same group of forwarding hubs for receiving flows of first and second categories from the first site.

10. The method of claim 1, wherein each forwarding hub in the plurality of forwarding hubs is associated with a different network address, wherein sending the packet from the forwarding edge at the first site to the identified hub at the datacenter third site comprises sending the packet from the forwarding edge at the first site to a network address associated with the identified hub at the datacenter third site.

11. The method of claim 1, wherein the plurality of forwarding hubs act as gateways for accessing the resources at other branch sites or at a third party datacenter, including the second site.

12. The method of claim 11, wherein the plurality of forwarding hubs also provide access to resources of the datacenter.

13. The method of claim 11, wherein the plurality of branch sites are arranged topologically around the datacenter in a hub and spoke topology.

14. The method of claim 1, wherein the plurality of hub selection rules are received from a controller of the SD-WAN.

15. The method of claim 14 further comprising receiving an updated set of hub selection rules from the controller, wherein the updated set of hub selection rules comprise at least one hub selection rule identifying at least one additional forwarding hub for receiving a particular category of flows from the first site.

16. The method of claim 15, wherein the controller generates the updated set of hub selection rules based on an analysis of network traffic statistics from the plurality of forwarding hubs.

17. The method of claim 16, wherein the controller analyzes the network traffic statistics to identify groups of forwarding hubs that need additional or fewer forwarding hubs for receiving flows from the first site.

18. The method of claim 1, wherein sending the packet to the identified forwarding hub comprising sending the packet via any one of fiber, cable, 5G, and Digital Subscriber Line (DSL).

19. The method of claim 11, wherein the plurality of branch sites connect to the plurality of forwarding hubs at the datacenter through one of a virtual private network (VPN) domain and an IPSec domain, wherein packets are encrypted at forwarding edges of the plurality of branch sites and decrypted by the plurality of forwarding hubs.

20. The method of claim 1, wherein at least one hub-selection rule identifies a first forwarding hub group for first and second different sets of flow, the method further comprising receiving a new hub-selection rule identifying a second forwarding hub group to which to send the second set of flows.

21. The method of claim 1, wherein the forwarding edge of the first site is a first forwarding edge of a high-availability pair of forwarding edges of the first site, wherein the first forwarding edge is an active edge of the first site and a second forwarding edge of the high-availability pair of forwarding edges is a standby forwarding edge of the first site.

* * * * *